Patented Sept. 15, 1936

2,054,397

UNITED STATES PATENT OFFICE 2,054,397

AZODYESTUFFS AND INTERMEDIATE PRODUCTS THEREFOR

Carl Taube, Leverkusen-Wiesdorf, Germany, assignor to General Aniline Works, Inc., New York, N. Y., a corporation of Delaware No Drawing. Application July 21, 1934, Serial No. 736,432. In Germany August 26, 1933

12 Claims. (Cl. 8—6)

The present invention relates to new derivatives of cyanamide and to the use of the said derivatives for the manufacture of azodyestuffs, more particularly it relates to compounds which may be represented by the probable general formula:

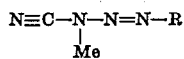

wherein Me stands for a monovalent metallic radical, such as an alkali metal,

and the like, and R stands for a benzene nucleus bearing at least one non-solubilizing substituent, such as alkyl, alkoxy, halogen, the nitro group, the sulfoneamide group in which the hydrogen atoms may be wholly or partially substituted, for example, by alkyl, aralkyl or aryl, further as substituents there may be present aryloxy, the trifluoromethyl group, the group $SO_2R$, in which R stands for alkyl, aryl or aralkyl, or a substituted amino group, such as alkylamino, arylamino and acylamino, or an azo group, or R may stand for a polynuclear aromatic radical, such as a radical of the naphthalene, anthraquinone, anthracene and carbazole series which may bear non-solubilizing substituents.

My new compounds are obtainable by causing cyanamide or a salt thereof, especially an alkali metal salt, to react with the diazo compound of an aromatic amine of the formula: $R-NH_2$, in which R means the same as stated above, advantageously in a caustic alkaline to sodaalkaline medium and at low temperature.

My new compounds are generally well crystallizing substances, soluble in water, stable at room temperature and also at higher temperatures, say at about 90° C., and insensitive towards percussion.

A further step of the invention resides in the use of my new compounds in the manufacture of azodyestuffs in substance or on a substratum, especially the cellulosic fibre; for, due to the fact that on acidifying, the new compounds are split up into the originating diazo compounds, a metal halogenide (in case hydrochloric acid is used), and urea, they are valuable products for dyeing and printing purposes. This splitting up proceeds according to the following equation:

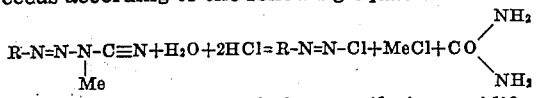

From the equation it is to be seen that on acidifying the new stable compounds, there are obtainable diazo solutions ready for being used for dyeing or printing purposes, in which diazo solutions a re-formation of the starting cyanamide derivative after neutralization of the acid used as splitting agent cannot enter due to the chemical alteration of the cyanamide.

Further my new compounds can be brought into contact with the coupling components generally used in the manufacture of ice colors in an alkaline medium without a coupling to the azodyestuff taking place. Thus, there can be prepared mixtures from my new compounds and coupling components in which the two ingredients are favorably present in about equimolecular proportions which mixtures are stable and can be stored for a prolonged time; if desired, to these dyeing preparations wetting and/or dispersing agents may be added. These preparations are especially valuable for printing purposes; they can be worked into printing colors and yield after printing and developing in an acid medium full and clear prints. For developing the print it is sufficient in some cases to hang the print in the air.

The invention is illustrated by the following examples, without being limited thereto:

*Example 1.*—30 grams of 5-nitro-2-amino-1-methoxy-benzene are mixed together in the cold with 60 ccs. of concentrated hydrochloric acid and 60 ccs. of water and diazotized in the usual manner. The filtered diazo solution is stirred while cooling into a solution of 25 grams of sodium cyanamide and 80 grams of sodium carbonate in 500 ccs. of water. The bulk of the reaction product separates in a crystalline form. The separation of the compound of the formula:

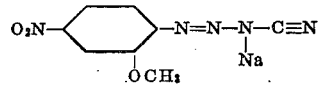

is completed by the addition of common salt; the product is filtered with suction and after recrystallization with charcoal from hot water obtained in form of yellow crystals, difficultly soluble in cold and easily soluble in hot water. The yield is rather quantitative.

*Example 2.*—30 grams of 5-nitro-2-amino-1-methylbenzene are diazotized while well cooling with 13.5 grams of sodium nitrite in the presence of 70 ccs. of concentrated hydrochloric acid and 70 ccs. of water, and the filtered diazo solution is introduced while stirring and cooling into a solution of 40 grams of sodium cyanamide and 100 grams of sodium carbonate in 500 ccs. of water. The yellow crystalline precipitate is filtered with suction and redissolved from hot water with charcoal. The new compound of the formula:

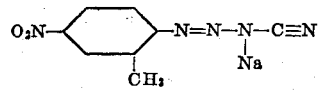

is obtained in form of yellow crystals which are easily soluble in warm water. It can be dried at 100° C. without decomposition.

Instead of the sodium cyanamide there can be used the solutions obtainable by decomposing calcium cyanamide (lime-nitrogen) with sodium or potassium carbonate in an aqueous medium and filtering.

*Example 3.*—30 grams of 2.5-dichloroaniline are diazotized in the usual manner, and the filtered diazo solution is introduced while stirring and cooling into a solution of 30 grams of sodium cyanamide and 50 grams of sodium carbonate in 500 ccs. of water. The reaction mass is allowed to stand over night, after this the precipitate is filtered, redissolved from hot water with charcoal and dried at 100° C. The new compound of the formula:

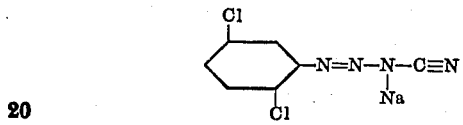

is obtained in form of pale colored crystals, easily soluble in warm water.

*Example 4.*—50 grams of 4-amino-4'-nitro-3-methoxy-6-methylazobenzene are diazotized in the usual manner, and the diazo solution, if necessary after filtering, is stirred while cooling into a solution of 35 grams of sodium cyanamide and 50 grams of sodium carbonate in 1000 ccs. of water. The brown precipitate is filtered with suction, redissolved from water with charcoal and dried at 100° C. The new compound having the following formula:

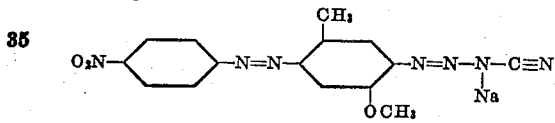

is obtained as a dark, bronze powder, easily soluble in warm water with a reddish-brown coloration.

*Example 5.*—10 grams of 4-nitro-2-chloroaniline are diazotized in 100 grams of 3-n-hydrochloric acid with 3.85 grams of sodium nitrite, and the diazotization mixture is neutralized from mineral acid to acetic acid by the addition of 40 grams of crystallized sodium acetate. The diazo solution thus obtained is introduced into a solution of 7.5 grams of technical sodium cyanamide in 200 ccs. of water which solution has been acidified with acetic acid. The powerful yellow and weakly acid solution is filtered from resinous by-products, and the diazoamino compound formed of the formula:

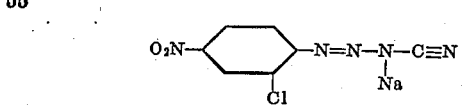

is salted out with common salt, it is filtered with suction and dried in the air on clay. After recrystallization from an aqueous weakly soda-alkaline sodium chloride solution, the sodium salt crystallizes in well-formed yellow needles which are arranged to tufts.

*Example 6.*—7.1 grams of 5-chloro-2-amino-1-methylbenzene are diazotized in 50 grams of 3-n-hydrochloric acid with 3.5 grams of sodium nitrite, and the diazo solution is introduced into a solution of 3.5 grams of free cyanamide of the melting point 40–42° C. in 200 ccs. of water and 20 grams of sodium carbonate. After one hour's standing the condensation product is salted out, it separates in form of fine needles which are filtered and dried. The compound corresponds to the following formula:

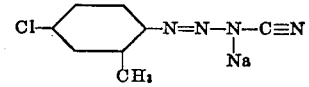

In an analogous manner the following diazoamino compounds have been prepared:

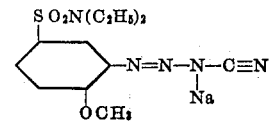

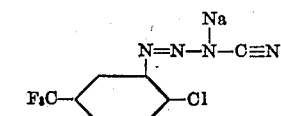

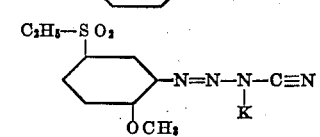

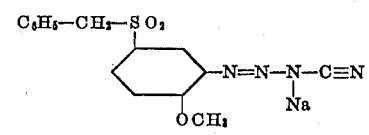

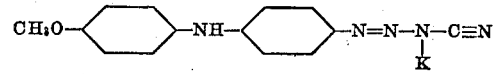

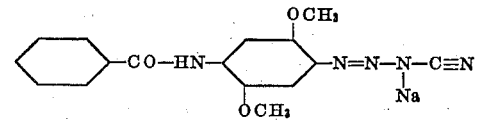

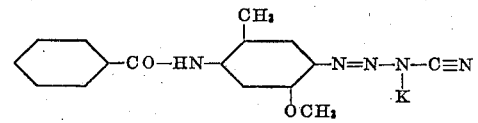

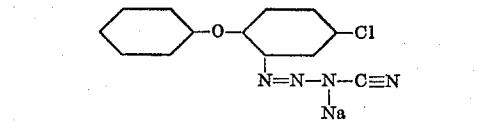

*Example 7.*—About equimolecular quantities of the following:

| Diazoamino-compounds | Coupling components |
| --- | --- |
| (a) coupling product from diazotized 5-nitro-2-anisidine and sodium cyanamide | 2.3-hydroxynaphthoic acid-α-naphthylamide |
| (b) coupling product from diazotized 5-nitro-2-toluidine and sodium cyanamide | 2.3-hydroxynaphthoic acid-o-toluidide |
| (c) coupling product from diazotized 4-chloro-2-anisidine and potassium cyanamide | 2.3-hydroxynaphthoic acid-o-anisidide |
| (d) coupling product from diazotized 1-amino-4-benzoylamino-2.5-dimethoxybenzene and sodium cyanamide | 2-hydroxyanthracene-3-carboxylic acid-o-toluidide |
| (e) coupling product from diazotized 2-aminocarbazole and potassium cyanamide | Diacetoacetic acid-o-toluidide | are intimately mixed together. If desired; to these mixtures there may be added stretching agents, such as Glauber's salt, and/or wetting agents, for example, 10% of the sodium salt of isobutylnaphthalene-disulfonic acid, and/or agents favoring the developing of the dyestuffs on the fibre, such as urea. These dyeing preparations can be stored for a prolonged time and are valuable for printing purposes. They can be worked into printing colors according to the usual methods and yield after printing and developing in an acid medium generally powerful shades of good fastness properties.

Example 8.—2.6 grams of the product obtained by coupling diazotized 5-nitro-2-anisidine and sodium cyanamide and redissolving from water are dissolved with 3.1 grams of 2.3-hydroxynaphthoic acid-α-naphthylamide, 24 ccs. of water, 3 ccs. of highly sulfonated castor oil and 3 ccs. of caustic soda, stirred with 50 grams of starch tragacanth thickener and filled up with water to 100 grams. With this printing color cotton tissue is printed, dried in superheated steam containing formic and acetic acid vapors, soaped in a boiling bath, rinsed and dried. A full bordo of good fastness properties is thus obtained.

The developing of the dyestuff can also be performed by passing the dried print through an aqueous formic or acetic acid solution of about 5-10% strength and a temperature of 50-60° C.

Example 9.—From 2.4 grams of the coupling product from diazotized 5-nitro-2-toluidine and sodium cyanamide and 2.8 grams of 2.3-hydroxynaphthoic acid-o-toluidide a printing color is prepared as described in Example 8. When printed on cotton the same yields after developing in an acid medium a full reddish-bordo of good fastness properties.

Example 10.—From 2.45 grams of the coupling product from diazotized 4-chloro-2-anisidine and sodium cyanamide and 3 grams of 2.3-hydroxynaphthoic acid-o-anisidide a printing color is prepared as described in Example 8. When printed on cotton the same yields after developing in an acid medium a full clear red of good fastness properties.

Example 11.—From 4 grams of the coupling product from diazotized 2-nitro-4-chloroaniline and sodium cyanamide and 2.8 grams of 2.3-hydroxynaphthoic acid anilide a printing color is prepared as described in Example 8. When printed on cotton the same yields after developing in an acid medium a full yellowish-red.

In an analogous manner the condensation products from sodium cyanamide and diazotized 4-nitro-2-toluidine, or 2-nitro-4-toluidine, or 4-chloro-2-toluidine, or 2.5-dichloroaniline, or 5-benzoylamino-2-amino-1.4-diethoxybenzene, or 4-amino-4'-nitro-3-methoxy-6-methyl-azobenzene, or 2-aminocarbazole or 1-aminoanthraquinone yield, when worked into printing pastes with coupling components generally used in the manufacture of ice colors, after printing on cotton and developing in an acid medium, powerful clear shades of good fastness properties.

I claim:

1. Preparations for dyeing and printing purposes comprising a compound of the general formula:

$$N\equiv C-N-N=N-R$$
$$\phantom{N\equiv C-}|$$
$$\phantom{N\equiv C-N-}Me$$

wherein Me stands for a monovalent metallic radical and R stands for a radical of the benzene series bearing at least one non-solubilizing substituent or for a polynuclear aromatic radical which may bear non-solubilizing substituents, and a coupling component generally used in the manufacture of ice colors.

2. Preparations for dyeing and printing purposes comprising a compound of the general formula as described in claim 1, and a 2.3-hydroxynaphthoic acid arylamide.

3. Preparations for dyeing and printing purposes comprising a compound of the general formula:

$$N\equiv C-N-N=N-R$$
$$\phantom{N\equiv C-}|$$
$$\phantom{N\equiv C-N-}Me$$

wherein Me stands for an alkali metal atom and R stands for a radical of the benzene series bearing at least one non-solubilizing substituent, and a coupling component generally used in the manufacture of ice colors.

4. Preparations for dyeing and printing purposes comprising a compound of the general formula as described in claim 3, and a 2.3-hydroxynaphthoic acid arylamide.

5. Preparations for dyeing and printing purposes comprising a compound of the general formula:

$$N\equiv C-N-N=N-R$$
$$\phantom{N\equiv C-}|$$
$$\phantom{N\equiv C-N-}Me$$

wherein Me stands for an alkali metal atom and R stands for a radical of the benzene series bearing at least one non-solubilizing substituent selected from the group consisting of alkyl; alkoxy; halogen; the nitro group; the sulfoneamide group in which the hydrogen atoms of the amino group may be substituted by alkyl, aralkyl or aryl; the trifluoromethyl group; the group $SO_2R$, in which R stands for alkyl, aryl or aralkyl; aryloxy; a substituted amino group and the azo group, and a coupling component generally used in the manufacture of ice colors.

6. Preparations for dyeing and printing purposes comprising a compound of the general formula as described in claim 5, and a 2.3-hydroxynaphthoic acid arylamide.

7. Process which comprises applying to cellulosic fibres a compound of the general formula as described in claim 1 and a coupling component generally used in the manufacture of ice colors and developing the dyestuff by treating the fibres in an acid medium.

8. Process which comprises applying to cellulosic fibres a compound of the general formula as described in claim 1 and a 2.3-hydroxynaphthoic acid arylamide, and developing the dyestuff by treating the cellulosic fibres in an acid medium.

9. Process which comprises applying to cellulosic fibres a compound of the general formula as described in claim 3 and a coupling component generally used in the manufacture of ice colors and developing the dyestuff by treating the cellulosic fibres in an acid medium.

10. Process which comprises applying to cellulosic fibres a compound of the general formula as described in claim 3 and a 2.3-hydroxynaphthoic acid arylamide, and developing the dyestuff by treating the cellulosic fibres in an acid medium.

11. Process which comprises applying to cellulosic fibres a compound of the general formula as described in claim 5 and a coupling component generally used in the manufacture of ice colors and developing the dyestuff by treating the cellulosic fibres in an acid medium.

12. Process which comprises applying to cellulosic fibres a compound of the general formula as described in claim 5 and a 2.3-hydroxynaphthoic acid arylamide, and developing the dyestuff by treating the cellulosic fibres in an acid medium.

CARL TAUBE.